(12) United States Patent
Louvel et al.

(10) Patent No.: US 10,511,870 B2
(45) Date of Patent: Dec. 17, 2019

(54) METHOD FOR ALLOCATING A DATA STREAM IN A SYSTEM COMPRISING AT LEAST ONE SERVICE FOR BROADCASTING DATA STREAMS AND AT LEAST TWO TERMINALS

(71) Applicant: THOMSON LICENSING, Issy de Moulineaux (FR)

(72) Inventors: Olivier Louvel, Iffendic (FR); Nadia Blivet, Rennes (FR); Matthieu Peneau, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 110 days.

(21) Appl. No.: 14/414,641

(22) PCT Filed: Jul. 4, 2013

(86) PCT No.: PCT/EP2013/064196
§ 371 (c)(1),
(2) Date: Jan. 13, 2015

(87) PCT Pub. No.: WO2014/009258
PCT Pub. Date: Jan. 16, 2014

(65) Prior Publication Data
US 2015/0208105 A1    Jul. 23, 2015

(30) Foreign Application Priority Data
Jul. 13, 2012    (FR) .................................... 12 56791

(51) Int. Cl.
*H04N 21/2385*    (2011.01)
*H04L 29/06*    (2006.01)
(Continued)

(52) U.S. Cl.
CPC ... *H04N 21/2385* (2013.01); *H04L 29/08954* (2013.01); *H04L 65/103* (2013.01);
(Continued)

(58) Field of Classification Search
CPC ........... H04N 21/2385; H04N 21/2402; H04N 21/26216; H04N 21/442; H04N 21/44209;
(Continued)

(56) References Cited

U.S. PATENT DOCUMENTS

2006/0184992 A1    8/2006    Kortum et al.
2009/0031384 A1*   1/2009    Brooks ............ H04N 21/23439
                                                     725/127

(Continued)

OTHER PUBLICATIONS

Brennan et al: "Poilicy-based integration of multiprovider digital home services" IEEE Network, vol. 23, No. 6, Nov. 1, 2009; pp. 50-56.

(Continued)

*Primary Examiner* — Benjamin R Bruckart
*Assistant Examiner* — Akshay Doshi
(74) *Attorney, Agent, or Firm* — Meagher Emanuel Laks Goldberg & Liano, LLP

(57) ABSTRACT

The invention relates to a method for allocating a data stream in a system comprising at least one service for broadcasting data stream, at least one server and at least two terminals, the one at least of said two terminals being able to receive a same program from at least two different sources, characterized in that said method comprises steps for: the reception, by said server, of a transmitted message by at least one first terminal, said message comprising an information indicating that said first terminal cannot receive a data stream identifying a source and a program, called first program that was asked for by request, the arbitration, by said server, of sources of said streams during transmission of (Continued)

Figure 1:
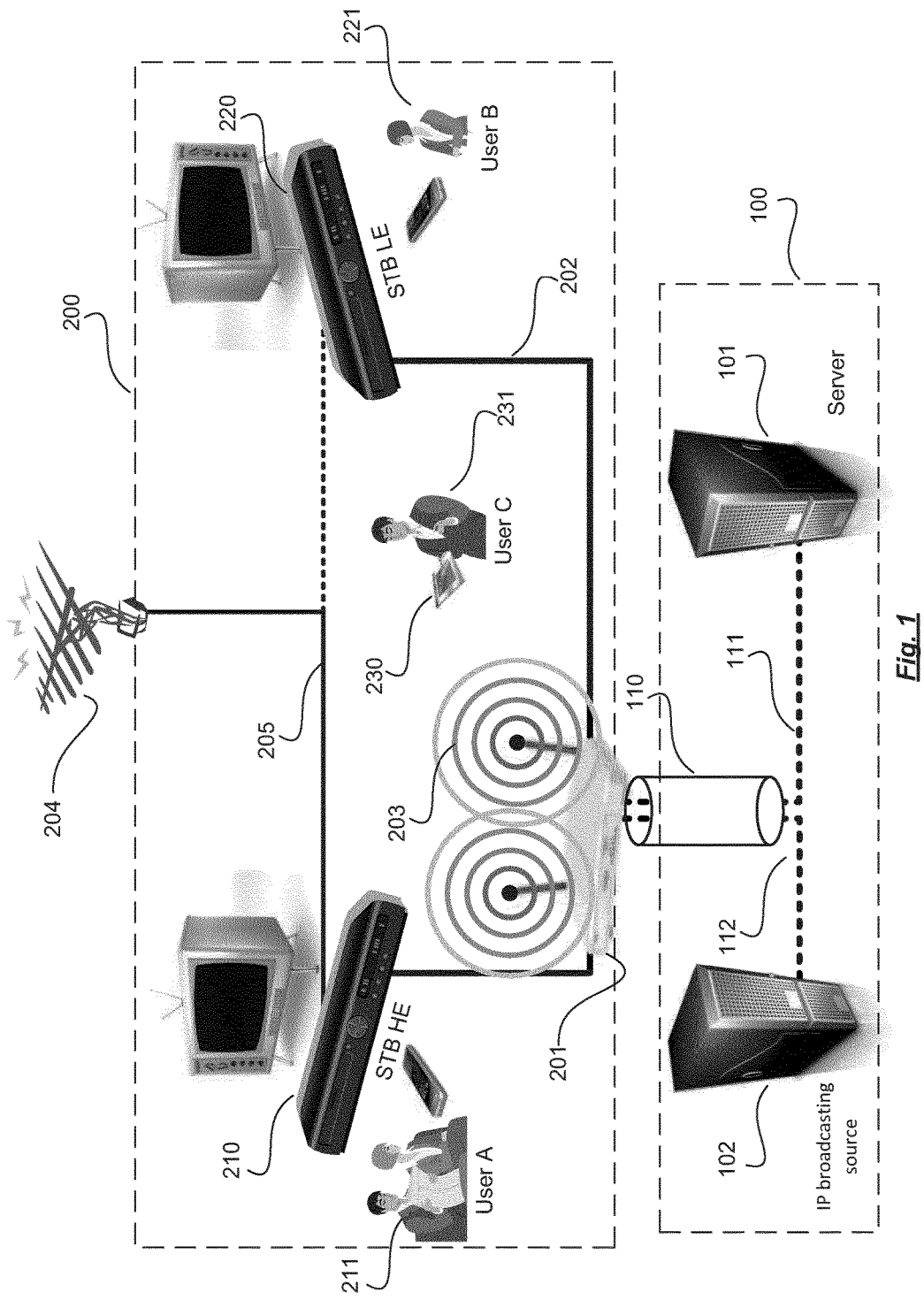

programs to said terminals and of said request, the notification for the change of source to at least a second terminal to which the broadcasting service broadcasts a program, called second program, in order to meet the request of the first program of said first terminal.

7 Claims, 6 Drawing Sheets

(51) Int. Cl.

| | | |
|---|---|---|
| H04L 29/08 | (2006.01) | |
| H04N 21/442 | (2011.01) | |
| H04N 21/6332 | (2011.01) | |
| H04N 21/6377 | (2011.01) | |
| H04N 7/173 | (2011.01) | |
| H04N 21/2381 | (2011.01) | |
| H04N 21/262 | (2011.01) | |
| H04N 21/4425 | (2011.01) | |
| H04N 21/462 | (2011.01) | |
| H04N 21/61 | (2011.01) | |
| H04N 21/643 | (2011.01) | |
| H04N 21/436 | (2011.01) | |
| H04N 21/2343 | (2011.01) | |
| H04N 21/2665 | (2011.01) | |

(52) U.S. Cl.
CPC .......... *H04L 65/4076* (2013.01); *H04L 65/80* (2013.01); *H04L 67/322* (2013.01); *H04N 7/17345* (2013.01); *H04N 21/2381* (2013.01); *H04N 21/23439* (2013.01); *H04N 21/2665* (2013.01); *H04N 21/26216* (2013.01); *H04N 21/436* (2013.01); *H04N 21/4425* (2013.01); *H04N 21/44209* (2013.01); *H04N 21/4622* (2013.01); *H04N 21/6125* (2013.01); *H04N 21/6332* (2013.01); *H04N 21/6377* (2013.01); *H04N 21/64322* (2013.01)

(58) Field of Classification Search
CPC ....... H04N 21/44227; H04N 21/64738; H04N 21/2665; H04N 21/23439; H04N 21/6377; H04N 21/6332; H04N 21/436; H04N 7/17345; H04N 21/6125; H04N 21/4425; H04N 21/4622; H04N 21/64322; H04N 21/2381; H04L 29/08954; H04L 65/80; H04L 65/4076; H04L 65/103
See application file for complete search history.

(56) References Cited

U.S. PATENT DOCUMENTS

| | | | |
|---|---|---|---|
| 2009/0067328 A1 | 3/2009 | Morris et al. | |
| 2009/0193485 A1* | 7/2009 | Rieger | H04N 21/2402 725/114 |
| 2010/0058400 A1 | 3/2010 | Nicas et al. | |
| 2010/0131650 A1 | 5/2010 | Pok et al. | |
| 2010/0138646 A1 | 6/2010 | Aloni et al. | |
| 2011/0296475 A1* | 12/2011 | Craner | H04H 20/103 725/90 |
| 2011/0307900 A1* | 12/2011 | Fatehpuria | G06F 9/50 718/104 |
| 2013/0219073 A1* | 8/2013 | Dong | H04L 65/605 709/231 |

OTHER PUBLICATIONS

Seo Etal: "TV Channel Sharing System Using Wireless Network Publication Data"; 2011 IEEE International Conference on Consumer Electronics (ICCE); pp. 317-318.
Search Report dated Sep. 30, 2013.

* cited by examiner

METHOD FOR ALLOCATING A DATA STREAM IN A SYSTEM COMPRISING AT LEAST ONE SERVICE FOR BROADCASTING DATA STREAMS AND AT LEAST TWO TERMINALS

This application claims the benefit, under 35 U.S.C. § 365 of International Application PCT/EP2013/064196, filed Jul. 4, 2013, which was published in accordance with PCT Article 21(2) on Jan. 16, 2014 in English and which claims the benefit of French patent application No. 1256791, filed Jul. 13, 2012.

This invention relates to the reception of programs or data on a network interconnecting terminals sharing this bandwidth. It relates more specifically to a method of arbitration of a multimedia stream choice selected by a reception terminal.

This invention is of particular but non-restrictive interest, in the television domain, and more specifically in the IPTV ("Internet Protocol Television") and the selection of a channel associated with the bandwidth constraint available on the subscriber's digital line ("xDSL, DSL for Digital Subscriber Line").

The appearance of hybrid terminals enables to overcome the constraints in order to meet the display needs of a channel in the absence of sufficient bandwidth.

In the IPTV networks, the terminals are connected to a subscriber's digital line also called xDSL, via a local network and a gateway. The possibility to receive video streams depends on the bandwidth available on the xDSL line. An increased demand of bandwidth due to the multiplication of reception terminals on the local network on the one hand, and the increase of the bitrates required by the high definition (HD) streams on the other hand can sometimes prevent to deliver the stream selected by the user to a terminal.

According to the prior art, some solutions have been implemented within the equipment concerned on the local network, in order to attempt to resolve conflicts during a stream demand in the presence of an available insufficient bandwidth. The first solution consisted within the reception terminals, in the case of an insufficient bandwidth, in seeking for the selected channel in the service plan for a lower quality for example going from the high definition to the standard definition, then providing an error message in the absence of a solution. This equipment internal solution does not take into account the state of other equipment of the local network. Hybrid equipment which contain IP reception means, also contain reception means of other type such as DTT (Digital Terrestrial Television) tuner have also been developed. These means offer an alternative solution provided by the DTT service plan in the case of insufficient bandwidth on the xDSL line. However, this solution does not resolve all conflicts and is restricted to the channels available in both the IP and the DTT service plans. This solution is restricted due to the small number of channels available on the DTT network. Another solution based on the interoperable reception terminals used on the local network also exists. One of the terminals integrates a management system. The purpose of this terminal, identified as a base terminal, is to manage the conflicts within the standard terminals. In a conflict situation, the user is informed by the interface and must resolve it using a list of proposed solutions.

The user is thus forced to intervene to resolve the conflict.

The invention proposes to overcome at least one of the disadvantages of the prior art, by a method processing the conflict caused by the choice of a channel in the presence of an insufficient bandwidth.

The purpose of the invention is an automatic and transparent method of arbitration by a server between requests made by the different terminals, the available sources delivering the requested programs and the possibility to deliver the programs. The result of this arbitration may be translated by a change of source for a terminal on the client's local network.

For this purpose, the invention relates to a method for allocating a data stream in a system comprising at least one service for broadcasting data stream, at least one server and at least two terminals, the one at least of said two terminals being able to receive a same program from at least two different sources.

According to the invention, the method comprises the steps for:
  the reception, by said server, of a transmitted message by at least one first terminal, said message comprising an information indicating that said first terminal cannot receive a data stream identifying a source and a program, called first program that was asked for by request,
  the arbitration, by said server, of sources of said streams during transmission of programs to said terminals and of said request,
  the notification for the change of source to at least a second terminal to which the broadcasting service broadcasts a program, called second program, in order to meet the request of the first program of said first terminal.

The invention also relates to a device connected to a service for broadcasting data stream and to at least two terminals, the one at least of said two terminals being able to receive a same program from at least two different sources.

According to the invention, the device comprises:
  means for reception of a message, transmitted by at least one first terminal, comprising an information indicating that said first terminal cannot receive a data stream identifying a source and a program, called first program that was asked for by request,
  means for arbitration of sources of said streams during transmission of programs to said terminals and of said request,
  means for notification for the change of source to at least a second terminal to which the broadcasting service broadcasts a program, called second program, in order to meet said request of said first terminal.

Figure 1A:
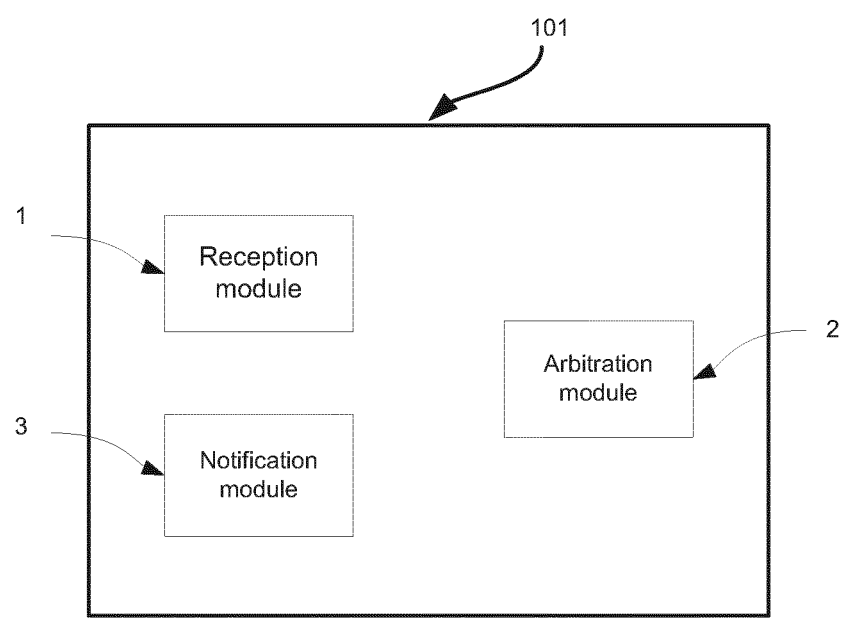
Figure 2:
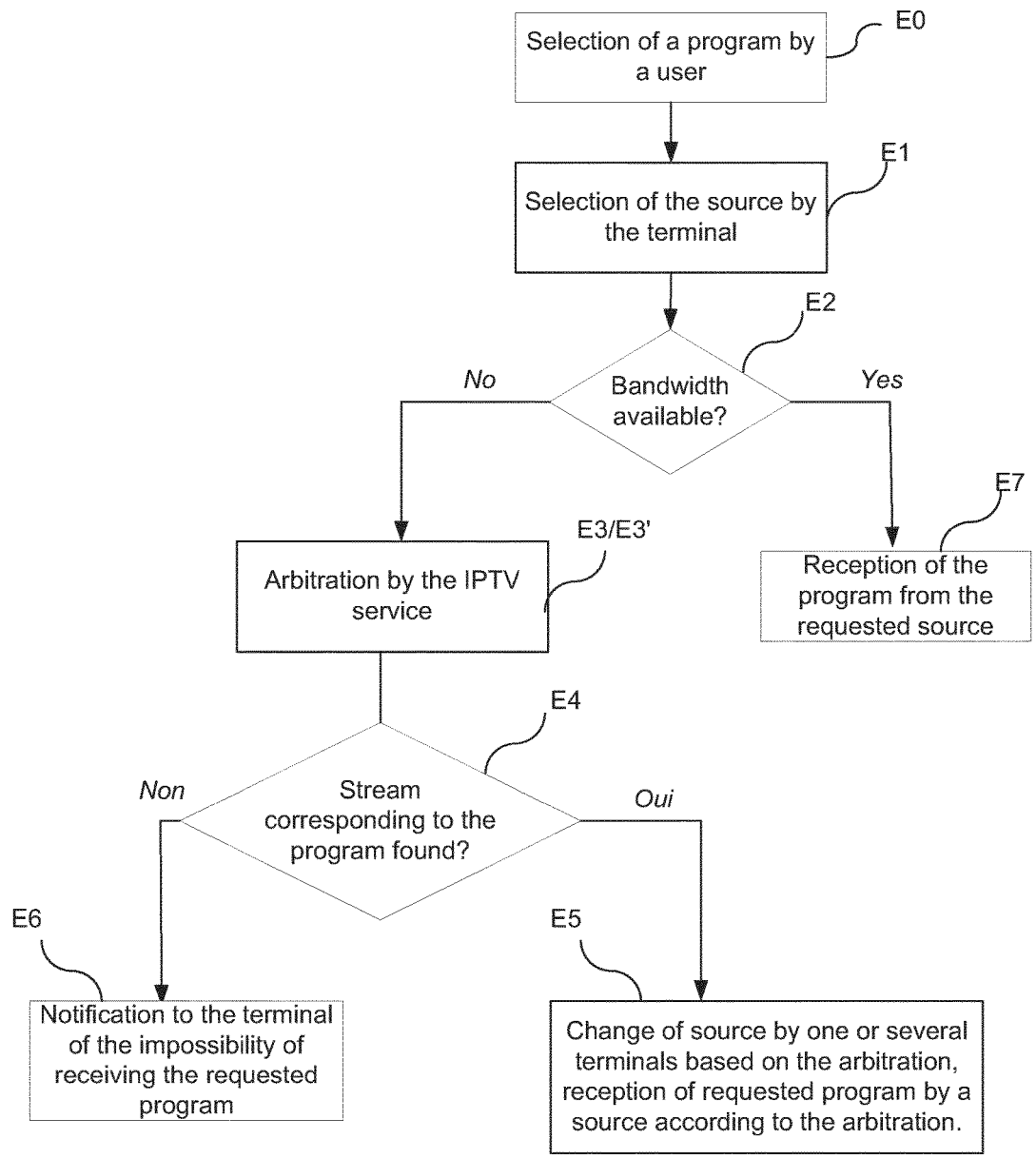
Figure 3:
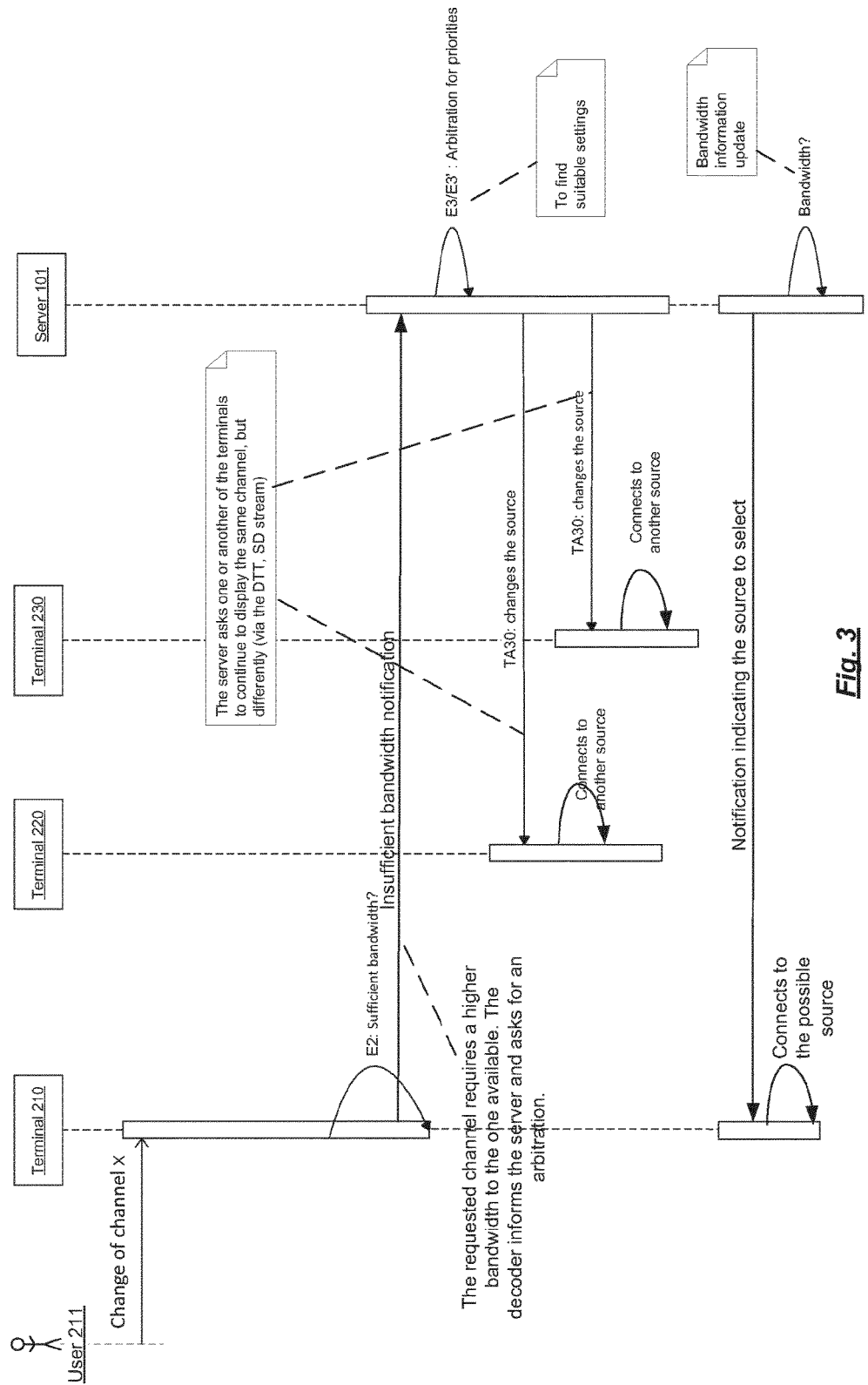
Figure 4:
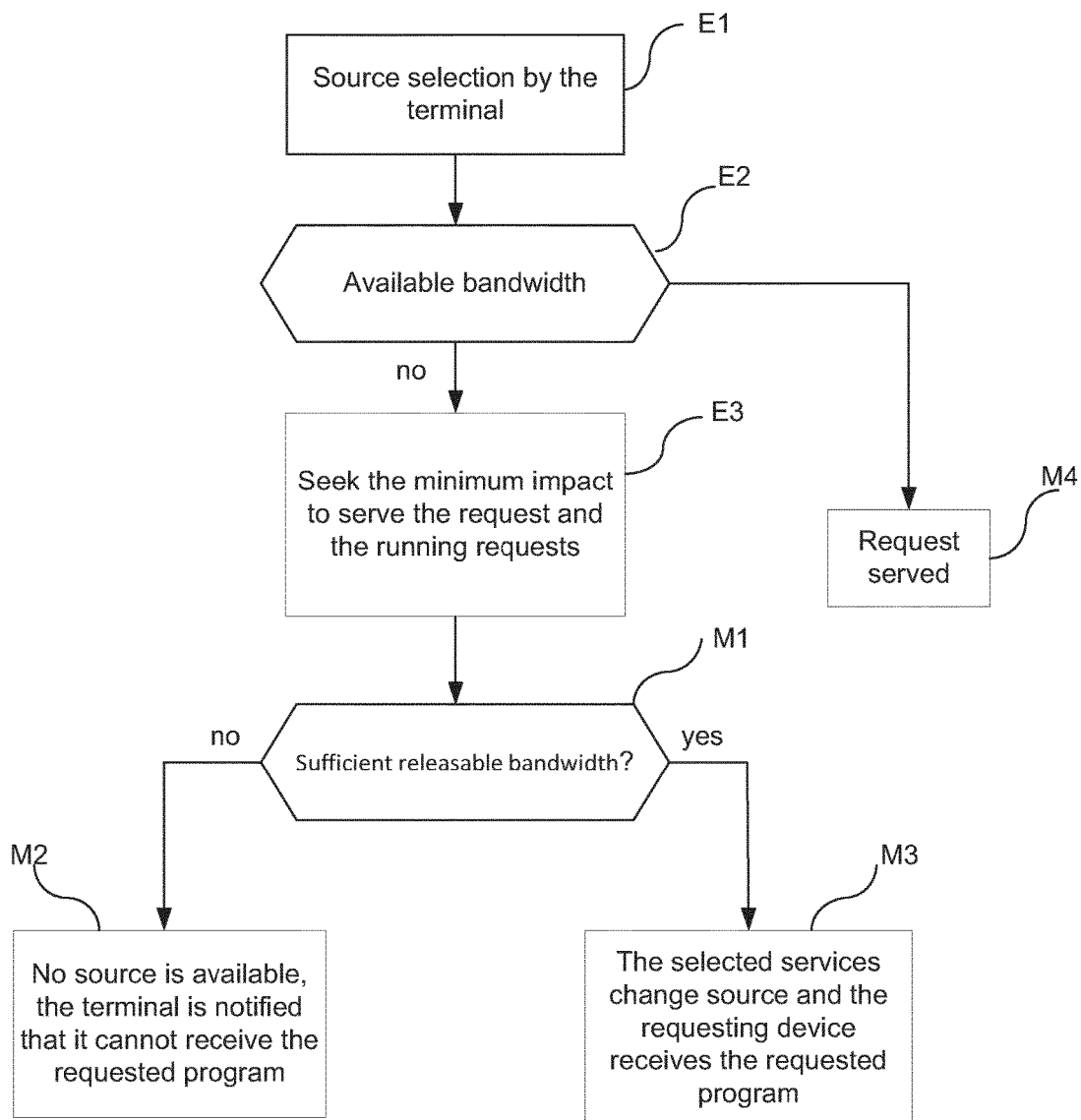
Figure 5:
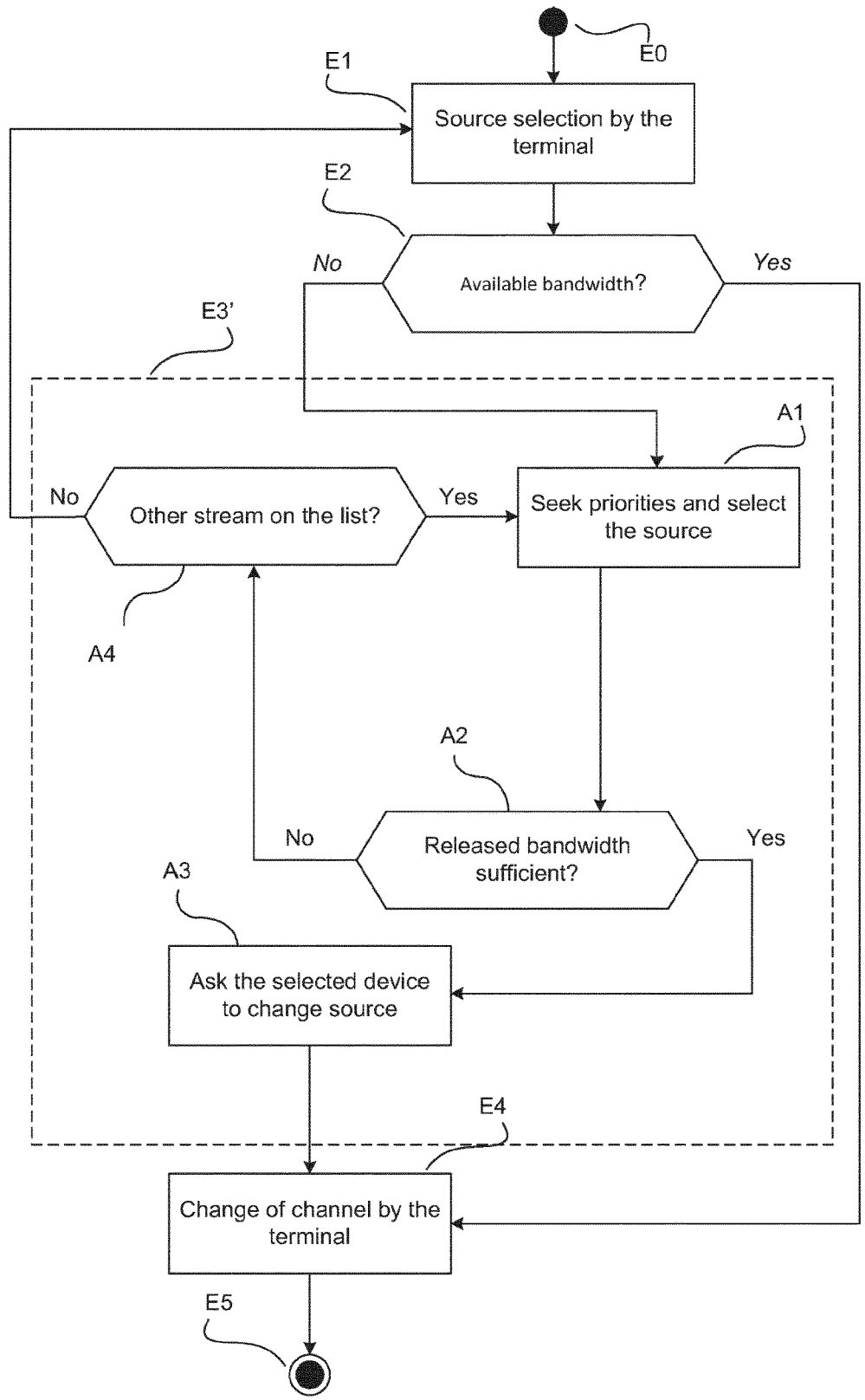

The invention will be better understood and illustrated over the course of the detailed description by advantageous means of embodiments and implementations, by no means limiting, with reference to the annexed drawings wherein:
  the FIG. 1 shows a schema of architecture of typical IP system,
  the FIG. 1A is a schematic representation of an example of system servers of FIG. 1,
  the FIG. 2 displays the selection steps of a channel between the different actors of the IPTV system,
  the FIG. 3 displays the chronological order of interactions between system actors and modules according to a preferred embodiment of the invention,
  the FIG. 4 displays the arbitration procedure privileging the priority to the minimum impact, the FIG. 5 displays the arbitration procedure privileging the priority to the service or to the terminal, The following description is based on an IPTV network type on an ADSL line. It is understood that this is given as a non-restrictive example and that other network types may be used. The invention is thus not restricted to this type of network. Likewise the shown hybrid terminals are able to receive IP stream and stream coming from DTT, this is also provided as a non-restrictive example and other hybrid terminals able to receive two or more than two types of stream may fall within the scope of this invention.

In reference to FIG. 1, an IPTV network, typical and consisting of equipment in the cloud 100, connected via a digital subscribers' line xDSL or local loop 110 to a subscriber 200.

In the cloud, a server 101 and a broadcasting service for IPTV 102 audio/video stream are notably available to ensure the IPTV function.

At the subscriber's, the xDSL line is connected to a gateway 201. This gateway comprises in addition to the interface with the xDSL line, a plurality of network interfaces for the subscriber's communication needs, such as for example interfaces to enable a connection to a wired local network 202 or wireless 203. On the local network 202, at least two IP reception terminals 210, 220 are connected. A portable item of equipment 230 is connected to the wireless network 203.

The terminal 210 is a hybrid terminal, including means to receive stream from a second type of media. The terminal 210 is a STB HE "set top box high end" type. It is commonly called decoder.

It receives HD and SD stream. Being a high-end terminal, it comprises recording means and it is also called PVR ("Personal Video Recorder"). By way of example, the media 204 shown on the figure is a DTT media. However, this example is not restrictive and may be a satellite SAT media or even CAB cable. The hybrid terminal may comprise all combinations for reception means. It is connected to media 204 via the intermediary of network 205.

The terminal 220 is a LE "low end" terminal. The terminal 220 is a STB LE "low end" terminal. It is also commonly called decoder.

It receives SD stream, or even HD according to cases. The terminal 220 type is given as a non-restrictive example and may well be a high-end terminal identical to STB HE 210 terminal.

The terminal 230 is a portable equipment comprising characteristics enabling to connect to a portable local network on the one hand and is able via this network to serve as an IPTV portable terminal. This may be given as a non-restrictive example a tablet, a portable computer, a notebook being able to decode a multicast or unicast stream received from IP network.

The user can, according to the equipment characteristics, display programs of different services, LIVE programs, recorded programs, or from the video on demand called VOD.

As shown on FIG. 1A, the server 101 may comprise:
a module 1 for the reception of a message, transmitted by at least one first terminal 210, 220, 230, comprising an information indicating that said first terminal cannot receive a data stream identifying a source and a program, called first program that was asked for by asked for by request,
a module 2 for arbitration of sources of said stream during transmission of programs to said terminals and of said request,
a module 3 for notification for the change of source to at least a second terminal 210, 220, 230, to which the broadcasting service broadcasts a program, called second program, in order to meet said request of said first terminal.

It is to be noted that modules 1, 2 and 3 of FIG. 1A show functional entities which do not necessarily correspond to distinct physical entities. In other words, the modules 1, 2, 3 may be developed in the form of software, hardware or even implemented in one or several integrated circuits, comprising one or several processors.

The FIG. 2 shows the selection steps of a channel. According to the reception terminals' operation, the user 211, 221, 231 chose the channel they want to display from the list of channels made available to him/her via his/her respective terminal 210, 220, 230. The user selects the program he/she wants to receive during step E0. The terminal selects, during step E1, from the sources available in the service plan for this program, the source which has the highest priority and for which the characteristics are compatible with the terminal capacity. The table 1 below summarizes the terminals' capacity of our example.

TABLE 1 terminals' capacity

| Terminal | Source | | | | |
|---|---|---|---|---|---|
|  | IP HD | IP SD | DTT HD | DTT SD | PVR |
| STB HE 210 | X | X | X | X | X |
| STB LE 220 | X | X |  |  |  |
| Portable equipment 230 |  | X |  |  |  |

As concerns the priority to the source, it can be considered to be different according to its media of origin (IP, DTT, SAT, CAB, etc), and its resolution.

The table 2 below displays an example of priority to the source. It should be understood that P0 is the highest priority level and P3 is the lowest. It is understood that this example may be modified based on the operator's needs.

TABLE 2 priority to the source

|  | IP HD | IP SD | DTT HD | DTT SD |
|---|---|---|---|---|
| Priority | P0 | P1 | P2 | P3 |

When the selected channel is available on the IP media, during step E2, the terminal ensures that the bandwidth available on the xDSL line is sufficient. The user selects a channel not a source, the terminal selects then the source in accordance to the invention.

The checking techniques of the bandwidth available on the xDSL line are well known to those skilled in the art. The methods known by those skilled in the art depend on a DSL access Multiplexer also called DSLAM (Digital Subscriber Line Access Multiplexer) and a feature CAC (Call Admission Control system) which updates an available bandwidth profile to get the IPTV. This profile contains notably, the total bandwidth and the one used. Solutions are available to provide this information to terminals 210, 220, 230 available on the local network 202 and 203. For example, the server 101 is able to maintain, for each subscriber, a table comprising on the one hand the total bandwidth and the bandwidth available on the xDSL from the CAC, and on the other hand by the bandwidth used by each terminal using this xDSL line. The server 101 knows thus how to distribute the bandwidth consumption and provide the available bandwidth to terminals as it progresses. Thus during the selection of a channel by a user, the terminal is able to check if the reception of this channel via the xDSL line is available or not. The checking may be carried out locally or offset on the server based on the checking method of the used bandwidth (information kept on the server or notification at the terminal level).

In the case where the source does not depend on the bandwidth (via the DTT media) the terminal tunes, during step E4, on the selected source. In the case where the source is an IP source, if the bandwidth is sufficient, the terminal subscribes to the selected source and enables the display of the channel. The source is a multicast and the subscription is carried out using an IGMP (Internet Group Management Protocol) request called IGMP Join. In the case where the terminal notes a lack of bandwidth on the xDSL line, either by looking-up the local table containing the bandwidth information, or by polling the server via an API (Application Protocol Interface). It informs the server 101 about the impossibility of satisfying the user's request. The server 101 proceeds to the arbitration E3, E3' to find a solution to the encountered problem.

For the arbitration, different embodiments are possible to achieve for example the priority to the minimum impact for the final user 211, 221, 231, the priority to the service or to the terminal. Different achievement variants are described in FIGS. 4 and 5.

During step E4, no stream corresponding to the requested program is found, so during step E6, the terminal is notified that there is insufficient bandwidth in order to receive the stream requested and that the request cannot be satisfied. If otherwise, a stream is found, then the terminal can receive the requested channel, step E5.

The result of the method can thus be achieved by several issues

The terminal can display the selected channel without impact on other terminals.

The terminal can display the program but this causes impact to another terminal.

And finally, in the case where the arbitration process, with the defined priority criteria, stream corresponding to the requested channel is not found.

Steps displayed on FIG. 2 show interactions between different devices that compose the system. These interactions are displayed by the FIG. 3, and the request, by the user 211, of a change of a channel. The terminal 210 carries out the selection steps for the source E1 and the available bandwidth E2 check, as described previously. In this scenario, the bandwidth of the local loop is not sufficient and the terminal 210 notifies the server 101 of the impossibility of satisfying the user's request during the transition T21 (FIG. 3). The server proceeds to an arbitration step E3' for this example. It identified that the terminal 220 can change the source to release the bandwidth required for the user 211 request and continue to display its program. The server 101 notifies the terminal 220 during a transition TA30 (FIG. 3), about a change request and giving indication about the new source to be used. In the shown scenario, a change request is also notified to terminal 230 during the transition TA30 (FIG. 3). Only terminals concerned by a change are notified.

Finally, during the transition TA30 (FIG. 3), the server 101 notifies the requesting terminal 210 of the possibility to receive the requested channel and the terminal 210 selects this channel.

After notifying the terminal 210 of the possibility to select the channel, the server updates the maximum information about the bandwidth, available or used on the xDSL line corresponding to the client.

The arbitration process of step E3, FIG. 2, by the change of source with minimum impact, is displayed on FIG. 4. It is based on a table 3 recording the impact level generated by the change of a source by another. For example, if the source of origin is an IPHD and the arbitration studies the solution to switch to another destination source DTT SD, the impact will be 6. By convention for the description, the impact is proportional to the used value. The table 3 is an example of impact table. Naturally, this may contain all possible sources Input. In addition, the level of impact for each combination is provided as a non-restrictive example. It can be fixed according to a method of the least squares, but any other method can be applied.

TABLE 3 change impact value between a source of origin and of destination

| | destination | | | | |
|---|---|---|---|---|---|
| origin | IP HD | IP SD | DTT HD | DTT SD | Off |
| IP HD | * | 5 | 1 | 6 | 100 |
| IP SD | * | * | 0 | 1 | 20 |
| DTT HD | * | * | * | * | * |
| DTT SD | * | * | * | * | * |

The arbitration of step E3 is initiated by the request for the display of a program not satisfied by a terminal, which notifies the server 101. This arbitration begins by seeking the change of source with the minimum impact according to table 3. This enables to identify the change envisaged and notably the source of origin concerned. The impacts considered are those of which the origin corresponds to running stream and the destination to possible stream compatible with the terminals' capacity (table 1).

For example, for the level 0 impact the change corresponds to a passage of stream of origin IP SD to a stream of destination DTT HD. In reference to table 3, if the choice of the impact value "0" is insufficient, switching also the IP SD stream to a DTT HD stream is planned, impact of "1" (the first impact "0" and the second impact "1") and if the released bandwidth is still not sufficient, then switching the stream to which the change to the higher or equal impact value is also planned. Thus, the terminals concerned will change stream to satisfy the terminal's request.

If all impact combinations have been run without releasing enough bandwidth, step M1, no possible solution is available. The terminal is notified during step M2 that it cannot receive the requested stream. If however, the released bandwidth is sufficient, then the terminals identified during step E3 change of source and the requesting terminal receives the requested stream.

An example enables to display this embodiment based on the arbitration with a minimum impact, the bandwidth on the xDSL line is fixed to 10 MB/s. In this scenario, two users A and C watch live programs and a recording is running, as it is summarized by table 4 below. The user A uses terminal 210 while the recording is carried out by the same terminal.

The user C uses a portable terminal 230. A user B wants to watch ABC channel on terminal 220, step E0.

TABLE 4 minimum impact scenario, context.

| User | terminal | state | channel | media | definition | bandwidth |
|---|---|---|---|---|---|---|
| A | STB HE (210) | LIVE display | CNN | IP | HD | 4 MB/s |
| C | portable terminal (230) | LIVE display | Canal+ | IP | SD | 2 MB/s |
|  | STB HE PVR (210) | record | TVBREIZH | IP | HD | 4 MB/s |

The availability of stream and the required bandwidth are as follows:

TABLE 5 minimum impact scenario, available sources

| Stream | IP HD | IP SD | DTT |
|---|---|---|---|
| CNN | 4 MB/s | 2 MB/s | X |
| Canal+ | 4 MB/s | 2 MB/s | 0 |
| TVBREIZH | 4 MB/s | 2 MB/s | 0 |
| ABC | 4 MB/s | 2 MB/s | 0 |

During step E1, the terminal 220, based on its capacities, referenced on table 1, can receive stream from IP media in the two SD and HD resolutions. It selects the highest priority source for the LIVE service, which is IP HD.

During step E2, the terminal checks the compatibility between the bandwidth required for the channel requested ABC IP HD and the bandwidth currently available. The terminal 220 notes that all the bandwidth is used. It thus cannot satisfy user B request to watch ABC while the terminal selects the source IP HD. The terminal 220 thus notifies the server 101 of the problem, which results in the triggering of the arbitration E3 process.

The impact table is run in the increasing order. For this, changes with the weakest impact are sought in table 3. According to the impact table, the minimal impact is equal to zero in the case of a change of stream of source IP SD to a stream DTT HD. It's the case of Canal+ stream displayed by the user C on the portable terminal 230. Unfortunately, the portable terminal 230 does not have the capacity to receive streams DTT HD, according to capacity table 1.

The process selects the high impact available on table 3 and reiterates the preceding search. Thus, three solutions are identified for an impact value equal to one. It is possible to switch sources IP HD to DTT HD. CNN, TvBreizh and ABC streams are concerned.

TvBreizh is received by the terminal 210, which is able according to table 1 to receive a DTT HD source, but the channel is not available in DTT HD, it is thus not possible to switch the recording to this source.

ABC is requested by the terminal 220. But this terminal is unable to receive DTT.

Finally, CNN received by the terminal 210, which is able to receive a DTT HD source, is available on the media DTT in HD. By switching to DTT HD, this solution releases 4 MB/s of bandwidth.

Then the released bandwidth for CNN is compared with the one required for ABC. It is sufficient. The terminal 210 is notified and it changes source automatically and transparently for the CNN channel on the DTT HD.

The process of arbitration by priority to the service or to the terminal is in overall the same shown on FIG. 5. This process is based on two sorting criteria: priority to the service and priority to the terminal. According to the arbitration process, one of the criteria is favoured with respect to the other during the search priority A1 step.

The arbitration description is based on the priority to the service. When receiving the notification, the first step A1 consists in sorting the display running stream by the different terminals 210, 220, 230. For this, the priority criteria linked with the service is initially applied. The different available services are for example the LIVE, the PVR or even the VOD. The table 6 summarizes the priority to the service. The highest priority is assigned to the PVR function, but any other sorting is valid.

TABLE 6 priority to the service

| Service | Priority |
|---|---|
| LIVE | P1 |
| PVR | P0 |
| VOD | P2 |

Then, a second sorting criterion is applied. This criterion is linked to the terminal and summarized by the table 7.

TABLE 7 priority to the terminal

| Terminal | Priority |
|---|---|
| STB HE | P0 |
| STB LE | P1 |
| Portable equipment | P2 |

TABLE 8 priority combination to the source and to the service

| | Source | | | |
|---|---|---|---|---|
| Service | IP HD | IP SD | DTT HD | DTT SD |
| LIVE | P0 | P1 | P2 | P3 |
| PVR | P0 | P1 | P2 | P3 |
| VOD | P0 | P2 | P1 | P3 |

During step A1, the lowest priority service is selected first, then a selection from the terminals that receive the selected service is made, the one with the lowest priority is selected. If it is the case with several terminals, then the lowest priority stream receiving terminal from these terminals is sought (table 8). Then, a stream that delivers the requested program and that releases enough bandwidth (step 2) to receive the requested program is sought. During step A4, if no stream corresponds because the terminal does not have the capacity on the one hand, and because on the other, no stream it receives (ex: DTT) carries the requested channel, thus the next terminal that is either a higher or same priority terminal but receiving a higher priority stream is sought. Once all terminals have been inspected, the next priority service continues.

If the released bandwidth is sufficient, step A2, the arbitration is followed by step A3, where the process notifies the terminal selected during step A1 that it needs to change source and switch to the one provided. Then, it notifies the requesting terminal on the possibility to display the requested channel.

According to an alternative, the requesting terminal does not receive notification from the arbitration process, but it is simply informed about the progression of the available bandwidth and can thus check the available bandwidth and activate the display of the requested channel.

In the case where no stream is left on this list, the requesting terminal is asked to select a lower priority source for this program. The process resumes at step E1. If no other source is available, the user cannot be satisfied and the process is completed, step E5.

According to another embodiment, the arbitration is produced with a priority said to the terminal. What distinguishes this variant, it's during step A1, the priority linked to the terminal is first taken into account for sorting the displayed stream, then priority linked to the service is taken into account. It is thus simply the priority order that is inversed and the operation of the other steps remains the same.

Naturally, the invention encompasses the different orders of the priorities to be taken into account, between the priority linked to the terminal and the service.

An embodiment can be displayed by the following example, in which, the total bandwidth available on the xDSL line is 10 MB/s. Two users A and B 211, 221 watch live transmissions. A user C wants to program the recording of a film on TVBREIZH, using terminal 210. TVBREIZH is available on the IP network in HD and SD. The different terminals state, known to server 101 is summarized on the following table 9:

TABLE 9 priority to the service scenario, context.

| User | terminal | state | channel | media | definition | bandwidth |
|---|---|---|---|---|---|---|
| A | STB HE (210) | LIVE display | CNN | IP | HD | 4 MB/s |
| B | STB LE (220) | LIVE display | CBS | IP | HD | 3 MB/s |

The availability of stream and the required bandwidth are as follows:

TABLE 10 priority to the service scenario, available stream

| Stream | IP HD | IP SD |
|---|---|---|
| CNN | 4 MB/s | 2 MB/s |
| CBS | 3 MB/s | 2 MB/s |
| TVBREIZH | 4 MB/s | 2 MB/s |

During step E1, the terminal selects the channel with the highest priority. The recording take place using the terminal 210 that is able according to table 1, to notably receive stream from IP media in the two HD and SD resolutions. The highest priority for the PVR service, from the media and the resolutions described according to table 2 is P0 for the IP HD source. Consequently, the terminal 210 selects the IP HD source, then continues on the second step E2 for the bandwidth checking.

The terminal calculates the consumed bandwidth during the reception of the recording request. This is a 7 MB/s, to which additional 4 MB/s are required for the reception of TVBREIZH. The 11 MB/s required for the reception exceed the maximum bandwidth (10 MB/s). The terminal notifies the server and triggers the arbitration process E3'.

The arbitration process initiated by the server 101 starts in step A1, table 11. Here, the priority to the service is taken into account first before the priority to the terminal. Two services are required, the live and the recording. The recording has more priority, thus the recording from terminal 210 request has more priority. The two LIVE services are thus considered to have a lower priority. Then, the priority is given to the terminal; here it is terminal 220 that has the lowest priority. The terminal 220 watches CBS channel.

TABLE 11 sorting example according to the service priority then the terminal

| stream priority order | service | service priority 1 | terminal | terminal priority 2 |
|---|---|---|---|---|
| CNN | Live | P1 | 210 | P0 |
| CBS | Live | P1 | 220 | P1 |

Then, during step A2, checking for the availability of a lower priority source for the CBS channel is carried out. According to the example, CBS is also available in SD, which enables to release 1 MB/s. The released bandwidth is sufficient A3, to receive TVBREIZH. The server 101, notifies thus the terminal 220 of the change of the displayed program type while indicating to shift to the CBS IP SD multicast address. Thus, the bandwidth is released and the requesting terminal can subscribe to the requested channel.

The arbitration method described above is assured by a server. This server may be available on an item of equipment 101 in the cloud. It may also be integrated to a gateway type device 201. In this case, the gateway 201 is connected on the one hand to a broadcasting service of data stream and on the other hand to at least two terminals, the one at least of said two terminals being able to receive a same program from at least two different sources. The gateway receives the request of a data stream identifying a source and a program, called first program, by at least a first terminal, either terminal 210 or terminal 220. Following the reception of this request, the gateway notes that this request cannot be served, for example because the bandwidth is not sufficient. In this case, the gateway 201 comprises a table indicating the available bandwidth or the bandwidth used and the services used for each terminal. It thus comprises means to identify that the request is not served. It will thus arbitrate the different running requests and services according to embodiments described in FIGS. 4 and 5 for example. Following the arbitration, when the arbitration reaches a change of source for one of the connected terminals, the gateway will notify the change of source to at least a second terminal to which the broadcasting service broadcasts a program, called second program, in order to satisfy the request of the terminal in a way that it transmits the second program to the second terminal from a second source.

The number of reception terminals available on the local network is given as a non-restrictive example. The hybrid terminals can meet any combination of reception means.

The invention claimed is:

1. A method for arbitrating source allocation at a network equipment configured to be connected to at least two terminals, said method comprising:

receiving, at said network equipment, a message transmitted by one first terminal and indicating that said first terminal cannot receive a requested first program from a first source because a bandwidth available on a network connecting said terminals with the network equipment is not sufficient, arbitrating, by said network equipment, between said first source and sources of programs being transmitted to said terminals, by determining, for each source, an impact value associated with a change of source with each one of other sources and compatible with terminal's capacity, wherein the impact value defining an impact level to a user watching a display of a program when switching between two sources with different resolutions for the same program, the impact level when switching from HD to SD being higher than the impact level when switching from SD to HD, the arbitrating beginning by seeking a change of source with a minimum impact value from a set of predefined impact values, notifying the change of source, determined by the arbitration, to at least a second terminal receiving a second program so that said first terminal is able to receive the requested first program from said first source.

2. The method according to claim 1 wherein during the arbitration, the bandwidth available on a network connecting said terminals with the network equipment is taken into account.

3. The method according to claim 2 wherein when the requested first program of said first source leads to an overflow of the bandwidth available on said network, a source consuming less bandwidth is allocated to at least said second terminal in a way that a total bandwidth associated with sources allocated to said terminals does not overflow the bandwidth available.

4. A device for arbitrating source allocation within a network, comprising:
   a module configured to receive a message, transmitted by one first terminal and indicating that said first terminal cannot receive a requested first program from a first source because a bandwidth available on a network connecting said terminals with the network equipment is not sufficient,
   a module configured to arbitrate between said first source and sources of programs being transmitted to terminals of the network, by determining, for each source, an impact value associated with a change of source with each one of other sources and compatible with terminal's capacity, wherein the impact value defining an impact level to a user watching a display of a program when switching between two sources with different resolutions for the same program, the impact level when switching from HD to SD being higher than the impact level when switching from SD to HD, the arbitrating beginning by seeking a change of source with a minimum impact value from a set of predefined impact values,
   a module configured to notify the change of source, determined by the arbitration module, to at least a second terminal receiving a second program so that said first terminal is able to receive the requested first program from said first source.

5. The device according to claim 4 wherein the arbitrating module is configured to take into account the bandwidth available on a network connecting said terminals.

6. The device according to claim 4 wherein, when the requested first program of said first source leads to an overflow of the bandwidth available on said network, the arbitrating module is further configured to allocate a source consuming less bandwidth to at least said second terminal in a way that a total bandwidth associated with sources allocated to said terminals does not overflow the bandwidth available.

7. A device for arbitrating source allocation within a network, comprising a memory and one or more processors configured:
   to receive a message, transmitted by one first terminal and indicating that said first terminal cannot receive a requested first program from a first source because a bandwidth available on a network connecting said terminals with the network equipment is not sufficient,
   to determine, for each source, an impact value associated with a change of source with each one of other sources and compatible with terminal's capacity, wherein the impact value defining an impact level to a user watching a display of a program when switching between two sources with different resolutions for the same program, the impact level when switching from HD to SD being higher than the impact level when switching from SD to HD, the arbitrating beginning by seeking a change of source with a minimum impact value from a set of predefined impact values,
   to arbitrate between said first source and sources of programs being transmitted to terminals of the network,
   to notify the change of source, determined by the arbitration, to at least a second terminal receiving a second program so that said first terminal is able to receive the requested first program from said first source.

* * * * *